United States Patent [19]

Kadehjian et al.

[11] 4,286,989
[45] Sep. 1, 1981

[54] FORMULATIONS FOR INK JET PRINTING

[75] Inventors: Leo J. Kadehjian, Woodside, Calif.; Harbans S. Sachdev, Wappingers Falls, N.Y.; Clinton D. Snyder, Los Gatos, Calif.

[73] Assignee: International Business Machines Corporation, Armonk, N.Y.

[21] Appl. No.: 192,270

[22] Filed: Sep. 30, 1980

[51] Int. Cl.$^3$ ............................... C09D 11/00
[52] U.S. Cl. ............................ 106/22; 260/166
[58] Field of Search ........................ 106/22; 260/166

[56] References Cited

U.S. PATENT DOCUMENTS

| | | | |
|---|---|---|---|
| 3,846,141 | 11/1974 | Ostergren et al. | 106/22 |
| 3,945,836 | 3/1976 | Miyata | 106/22 |
| 3,945,837 | 3/1976 | Miyata et al. | 106/22 |
| 4,155,768 | 5/1979 | Adams et al. | 106/23 |
| 4,159,203 | 5/1979 | Loock | 106/22 |
| 4,176,361 | 11/1979 | Kawada et al. | 346/1.1 |

Primary Examiner—Lorenzo B. Hayes
Assistant Examiner—Amelia B. Yarbrough
Attorney, Agent, or Firm—Joseph G. Walsh

[57] ABSTRACT

An ink for use in ink jet printing has as its coloring material a dye having the formula:

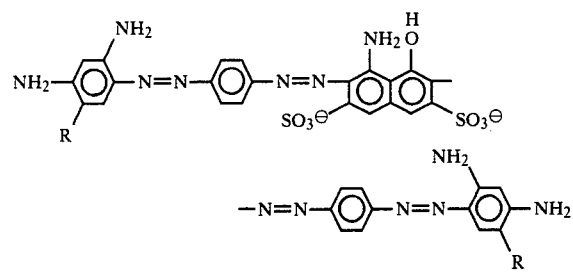

where R is $-OCH_2CO_2^-$, $-CH_2CO_2^-$, $-PO_3^=$ or $-CH_2-PO_3^=$.

7 Claims, No Drawings

FORMULATIONS FOR INK JET PRINTING

DESCRIPTION

1. Technical Field

The present invention is concerned with formulations for ink to be used in ink jet printing. The ink comprises tetrakisazo dyes containing carboxylate or phosphonate groups that confer upon the dye solubility in water at a pH of 7. The dyes have this formula:

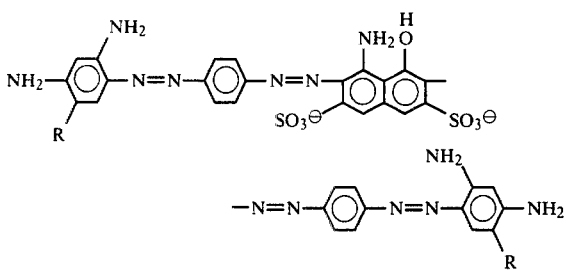

where R is $-OCH_2CO_2^-, -CH_2CO_2^-, -PO_3^=$ or $-CH_2-PO_3^=$.

2. Background Art

Ink jet printing is well known in the art. Several formulations for ink to be used in ink jet printing are known in the art. In this connection reference may be made to U.S. Pat. Nos. 3,846,141; 3,945,836; 3,945,837; 4,155,768; 4,159,203 and 4,176,361. None of these patents, however, in any way teaches the use of dyes having the structure of the dyes of the present invention.

DISCLOSURE OF THE INVENTION

According to the present invention, an ink for use in ink jet printing is provided. The ink is an aqueous solution having as a coloring material a tetrakisazo dye having the following formulation:

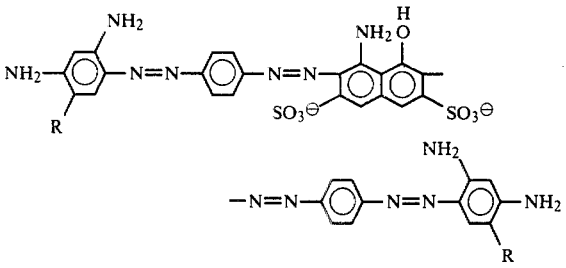

wherein R is $-OCH_2CO_2^-, -CH_2CO_2^-, -PO_3^=$ or $-CH_2-PO_3^=$.

These dyes confer several unexpected advantages upon the ink. In particular, the resulting inks have very desirable color characteristics. Furthermore, the dyes are quite soluble in water at a pH of 7. When the ink has a pH of 7, it causes fewer corrosion problems with the equipment for jet printing. In addition, the resulting ink has water-fastness.

The dyes of the present invention may readily be synthesized by known synthetic methods. For example, the well known dye Carta Black BI (also known as 4-amino-3,6-bis-(p-aminophenylazo)-5-hydroxy-2,7-naphthalenedisulfonic acid) and an appropriately functionalized m-phenylenediamine may be used as starting materials.

Carta Black BI (56.5 g) was dissolved in concentrated hydrochloride acid (600 ml) in a 5 l. roundbottom flask and chilled to 0°-4° C. A solution of sodium nitrite (13.8 g) in water (200 ml) was added with stirring. Then, with cooling to maintain a temperature less than 10° C., sodium acetate (82 g) was added and the reaction brought to pH 3 with 50% aqueous sodium hydroxide. A 1 M solution of 2,4-diaminophenylacetic acid in 1 N hydrochloric acid (200 ml) was added and the pH brought to 4. Other solubilizing diamines such as 2,4-diaminophenoxyacetic acid, 2,4-diaminophenylphosphonic acid or 2,4-diaminobenzylphosphonic acid may be substituted with equivalent results. After 3 hours at room temperature the pH was reduced to 1 with concentated hydrochloric acid.

The precipitated dye was obtained by centrifugation, washed with water and dried to yield product dye (50 g) $E_{0.1\%}^{615\ nm} = 26.0$.

As is known in the art, the dyes in the present invention may be formulated into ink formulations with known additives to confer desirable properties. These additives include, for example, a buffer to maintain the pH at 7. Other possible additives include a surfactant, a humectant, a penetrant, and an antimicrobial agent.

In general, it is desirable that the dyes be present in the ink formulation at a concentration of from about 1 to about 10% by weight. Usually it is most preferable that the dye be present at about 5% concentration.

The dye is preferably present in the form of an alkali metal salt such as the sodium or potassium salt, an ammonium salt, or a soluble amine salt.

A typical ink formulation is as follows:
Carbowax 200 (10 parts by weight)
Butyl carbitol (7 parts by weight)
Dye (5 parts by weight)
Sodium Omadine (0.1 parts by weight)
Distilled water (77.9 parts by weight)
Adjusted to pH 7.0 with 50% aqueous sodium hydroxide.

We claim:

1. An ink for use in ink jet printing comprising an aqueous solution of a coloring material having the formula

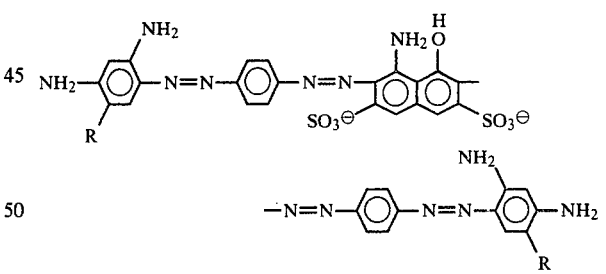

where R is $-OCH_2CO_2^-, -CH_2CO_2^-, -PO_3^=$ or $-CH_2-PO_3^=$.

2. An ink formulation as claimed in claim 1 wherein the dye is present in from about 1 to about 10% by weight concentration.

3. The ink formulation as claimed in claim 1 which also contains a buffer to maintain the pH at 7.

4. An ink as claimed in claim 1 in which R is $-OCH_2CO_2^-$.

5. An ink as claimed in claim 1 in which R is $-CH_2CO_2^-$.

6. An ink as claimed in claim 1 in which R is $-PO_3^=$.

7. An ink as claimed in claim 1 in which R is $-CH_2-PO_3^=$.

* * * * *